United States Patent [19]

Cunningham

[11] Patent Number: 4,970,863
[45] Date of Patent: Nov. 20, 1990

[54] MASTER CYLINDER RESERVOIR

[75] Inventor: Philip Cunningham, Gwent, Wales

[73] Assignee: Lucas Industries, Birmingham, England

[21] Appl. No.: 279,100

[22] Filed: Dec. 2, 1988

[30] Foreign Application Priority Data

Dec. 5, 1987 [GB] United Kingdom ............... 8728519

[51] Int. Cl.$^5$ .................. B60T 11/26; B60T 17/18
[52] U.S. Cl. ...................... 60/585; 60/533; 285/319; 285/921
[58] Field of Search ............ 60/533, 585; 92/142; 285/319, 921

[56] References Cited

U.S. PATENT DOCUMENTS

| | | | |
|---|---|---|---|
| 1,287,385 | 12/1918 | Martin | 285/319 |
| 4,452,128 | 6/1984 | Stoll | 285/921 |
| 4,503,678 | 3/1985 | Wimbush | 60/585 |
| 4,505,113 | 3/1985 | Reinartz et al. | 60/585 |
| 4,506,507 | 3/1985 | Wimbush | 60/585 |
| 4,514,983 | 5/1985 | Gaiser | 60/585 |
| 4,681,351 | 7/1987 | Bartholomew | 785/921 |
| 4,781,400 | 11/1988 | Cunningham | 285/921 |

FOREIGN PATENT DOCUMENTS

| | | | |
|---|---|---|---|
| 0065891 | 12/1982 | European Pat. Off. | 60/585 |
| 0214819 | 3/1987 | European Pat. Off. | 285/319 |
| 2408493 | 7/1979 | France | 60/585 |
| 0112401 | 8/1980 | Japan | 60/585 |
| 0194150 | 11/1982 | Japan | 60/585 |
| 945469 | 1/1964 | United Kingdom | 60/585 |
| 1283045 | 7/1972 | United Kingdom | 60/585 |
| 1380033 | 1/1975 | United Kingdom | 60/585 |
| 2077377 | 12/1981 | United Kingdom | 285/921 |

*Primary Examiner*—Edward K. Look
*Assistant Examiner*—Thomas Denion
*Attorney, Agent, or Firm*—Staas & Halsey

[57] ABSTRACT

A master cylinder reservoir is provided with flexible arms adapted to snap-engage with a retaining formation on a pressure cylinder, the arms lying generally parallel to a spigot of the reservoir received within a socket of the cylinder. A seal is provided between opposed surfaces of the spigot and socket.

34 Claims, 1 Drawing Sheet

MASTER CYLINDER RESERVOIR

BACKGROUND OF THE INVENTION

1. Field of the Invention

This invention relates to a master cylinder, primarily for use in a vehicle hydraulic braking system, and including a separately made hydraulic fluid reservoir having at least one connector means adapted to form a connection between the reservoir and a pressure cylinder.

2. Description of the Related Art

One prior master cylinder proposal is illustrated in our published British specification No. 2086512 and employs rubber bungs carried by the cylinder to receive hollow spigots projecting from the reservoir such as to mount the reservoir on the cylinder in fluid-tight manner. Our published British Specification No. 2064037 shows an alternative but similar form of connector spigot on a reservoir container. Both of these proposals provide a satisfactory reservoir to cylinder connection but have the disadvantage of being relatively expensive to manufacture because the rubber bung or other mounting means needs to be of somewhat complex form to perform the necessary retention and sealing functions and also of adequate substance and strength to serve as a mounting for the reservoir.

SUMMARY OF THE INVENTION

An object of the present invention is to provide a master cylinder in which the reservoir to cylinder mounting and connection is simplified, principally by enabling the use of a rubber bung to be avoided.

According to the present invention, the reservoir connector means is provided with flexible catch means snap-engaged with a retaining formation of the pressure cylinder in order to retain the reservoir in an operative position on the cylinder.

In one preferred arrangement, the catch means is in the form of at least one flexible arm which conveniently lies generally parallel to a projecting hollow spigot connector of the reservoir and has a formation thereon providing a shoulder for engagement with said retaining formation on the cylinder.

Said formation is conveniently adapted for reception within a socket on the cylinder adapted to receive said connector, for which purpose said shoulder projects laterally outwardly of said arm.

Conveniently, the reservoir connector means is shaped to accommodate an annular sealing element in such a manner that the element seals between respective opposing surfaces of the reservoir connector means and said socket.

Preferably, the reservoir, its connector means and the flexible catch means are integrally moulded.

BRIEF DESCRIPTION OF THE DRAWINGS

The invention will now be described, by way of example, with reference to the accompanying drawings in which.

DETAILED DESCRIPTION OF THE PREFERRED EMBODIMENTS

Figure 1:
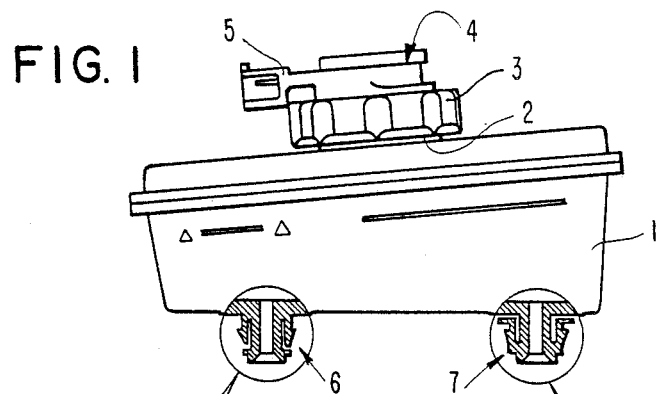
FIG. 1 is a side view, partly in cross-section, of one form of master cylinder reservoir of the invention and including, for the purpose of illustration, two alternative forms of connector means respectively at the right and left hand sides thereof.

Referring to FIG. 1, this illustrates a master cylinder reservoir which has a container 1 having, in an upper region thereof, a filler neck 2 closed by a screw closure cap 3. In this particular embodiment, the cap 3 carries a liquid level indicator 4 of which an electrical connection is indicated at 5. The container 1 is provided on its undersurface with a pair of port connectors 6 and 7 and whilst these would normally be identical on a single container, two alternative forms of connection are shown in FIG. 1 for convenience of illustration.

Figures 2, 3:
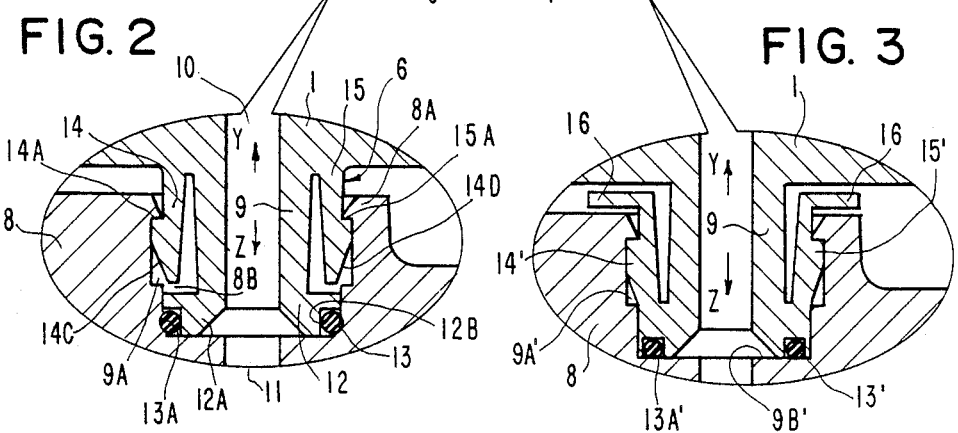
FIG. 2 is an enlarged detail of the left hand connector means of FIG. 1.
FIG. 3 is an enlarged detail of the right hand connector means of FIG. 1.

FIG. 2 illustrates, to a larger scale, part of the reservoir container 1 assembled by way of the connector 6 on a pressure cylinder 8. The connector 6 comprises a central hollow cylindrical spigot 9 extending from the base of the reservoir and forming a passage 10 which communicates with a radial port 11 through the cylinder wall to place in communication the respective interiors of the reservoir 1 and cylinder 8. The cylinder 8 has a socket 9A for receiving the spigot 9 in the manner to be described. The free extremity of the spigot 9 is formed with a generally radial flange formation 12, the extreme end portion 12A of the outer periphery of which is reduced in diameter to carry an annular seal 13. The portion 12A may have a peripheral groove 12B to aid retention of the seal thereon.

A pair of diametrically opposed arms 14, 15 extend from the underside of the reservoir in generally parallel relationship with and towards the free end of the spigot 9, each arm having a circumferential extent of, typically, approximately 50°. The external surface of each arm is stepped to form a shoulder 14A, 15A facing the base of the reservoir, and the entrance to the socket 9A is surrounded by an internally projecting flange 8A for co-operation with the shoulders 14A, 15A. A free end portion of each arm has an inwardly tapered outer surface 14C, 14D for the purpose to be described.

In order to assemble the reservoir 1 on to the cylinder 8, the reservoir connectors, which it will be assumed are both of the type designated 6, are offered to their respective cylinder sockets 9A. The distance between the radially outermost surfaces of the arms in their relaxed state is greater than the diameter of the internal radially facing surface of the cylinder flange 8A, but as the arms are forced into the sockets, they are resiliently deflected inwardly, aided by the action of the inclined end portions 14C, 14D, until the arms reach the position shown, at which time they resiliently recover outwardly to snap-engage behind the shoulders 14A, 15A of the flange 8A. This provides a very effective axial retention of the reservoir relative to the cylinder.

Prior to the assembly process, the sealing ring 13 is placed in position in the groove 12B around the smaller diameter portion of the spigot. As the reservoir connection is pushed into its socket, the seal 13 engages an internal cylindrical surface 8B of the socket and is compressed to form a fluid-tight seal between the flange 12 and surface 8B, the spigot being afforded axial guidance and support by engagement of the flange 12 with the surface 8B. It is possible to withdraw the connections 6 from their sockets by applying an inward force to the arms 14, 15 at their exposed upper ends in order to deform the arms inwardly and disengage the shoulders 14A, 15A from the flange 8A.

The alternative embodiment illustrated in FIG. 3 is essentially similar in principal to that of FIG. 2 and represents the connection designated 7 in FIG. 1. The main difference is that the arms 14', 15' are connected to the outermost end portion of the cylindrical portion 9 so that the free end portions of the arms are adjacent the base of the reservoir. A seal 13' is arranged in a manner substantially similar to the seal 13 of FIG. 2 to provide a fluid-tight seal between the reservoir connection and socket wall. In this embodiment, the upper exposed extremities of the arms 14', 15' are provided with lateral extensions in the form of tongues 16 which may be manipulated from the exterior in order to retract the tongues inwardly to permit removal of the reservoir from the cylinder. In both of the embodiments of FIGS. 2 and 3, the wall of the socket adjacent the final positions of the seals may be slightly inwardly recessed at 13A and 13A' to provide additional retention for the seals.

Figures 4, 5:
FIG. 4 is a view similar to FIGS. 2 and 3 illustrating a further alternative embodiment of reservoir connector means.
FIG. 5 illustrates further alternative forms of connector means respectively at the right and left hand sides thereof.

The reservoir, of which part is illustrated in FIG. 4, is designed for use with a cylinder having projecting spigots 20 in place of the sockets described above. The spigot 20 has a reduced diameter portion at its inner end forming a shoulder 21 behind which engage claws 22 at the end of diametrically opposed arms 23, 24, which, in this arrangement, extend from the axially outermost extremity of a cylindrical spigot 9' having a port 9" therethrough. The inwardly facing surfaces 25 of the arms are bevelled and the distance between the outer ends of the arms is smaller than the diameter of the spigot 20 so that the arms are resiliently outwardly expanded, as described above, when the reservoir is pressed onto the spigots 20, the arms subsequently resiliently recovering to snap engage behind the shoulder 21. In this embodiment, a groove 26 is formed in the end of the cylindrical 9' and receives a seal 27 which, during assembly, is compressed against the facing upper end of the spigot 20 to form a fluid-tight seal between the reservoir and cylinder.

In the alternative embodiment shown in FIG. 5, the invention is shown applied to a fabricated master cylinder having a thin-walled pressure cylinder 30 provided with port connectors 31, 32 secured to the cylinder, preferably by welding. The right-hand connector means 7 is similar to that shown in FIG. 3 and has a pair of arms 33, 34 of which shoulders 33A and 34A snap-engage behind shoulders 35 of the port connector 32. The shoulders 35 are formed by turning inwardly the outer peripheral extremities of the ports. An annular seal 36 is compressed between the underside of the connector means and the base of the port connector. This connector means 33 is assembled to the port connector 32 in the manner described previously. The left-hand connector means 6 has only a single arm 34 co-acting with a shoulder 35, in the manner already described. The wall of the port connector 31 is apertured at 37 to receive a flexible elbow 38, as of rubber or plastics for example. One arm 38A of the elbow engages within a hollow spigot 6A of the connector means 6 and the other arm 38B of the elbow extends outwardly through the aperture 37 and receives a tubular member 39 extending from an end closure member (not shown) of the cylinder. The elbow 38 may either be inserted through the aperture 37 and the spigot 6A connected to the arm 38A within the port connector, or the elbow may be connected to the spigot 6A prior to assembly of the reservoir on the cylinder, and the arm 38B fed through the aperture 37 for subsequent connection to the tubular member 39. For the latter assembly method, it may be necessary to elongate the aperture 37 in a direction radially of the cylinder 30.

It will be understood that any convenient number of arms may be used instead of the two shown in each of the above described embodiments and the shapes of the arms may be modified, as required, whilst still retaining the snap-engaging function described above. The cross-section of the seals 13, 13', 27 may, if required, be increased in size to ensure sealing even in the event of any slight relative movement between the reservoir and pressure cylinder. The reservoir may readily be formed as a single injection or blow moulding and can therefore be rapidly and conveniently manufactured and readily assembled onto a pressure cylinder during manufacture on a production line.

I claim:

1. A master cylinder comprising a hydraulic fluid reservoir having a container and at least one connector means engaged with port means of a pressure cylinder said connector means being provided with flexible catch means snap-engaged with a retaining formation of said pressure cylinder in order to retain the reservoir in an operative position on the cylinder,
   wherein the flexible catch means is in the form of at least one flexible arm having a formation thereon providing a shoulder engaging said retaining formation on the cylinder,
   wherein each connector means is shaped to accommodate an annular sealing element sealing between respective opposing surfaces of the reservoir connector means and said port means, and
   wherein the pressure cylinder is provided with at least one separately made port connector secured thereto, said connector being apertured to receive an elbow of which one arm is received within a hollow spigot of the reservoir and the other arm projects outwardly of the port connector for connection to a hollow element.

2. A master cylinder according to claim 1 wherein the at least one flexible arm lies generally parallel to and externally of a projecting hollow spigot connector of the reservoir extending within said cylinder port means and communicating with a port of the cylinder.

3. A master cylinder according to claim 1 wherein each said shoulder projects laterally outwardly of said arm.

4. A master cylinder according to claim 1 wherein the at least one flexible arm is connected to the reservoir adjacent the container and extends away from the latter.

5. A master cylinder according to claim 1, wherein the at least one flexible arm is connected to the connector means at a location remote from the container and extends towards the latter, the free ends of the arms lying outwardly of the cylinder port means and being provided with a lateral extension which may be manipulated from the exterior to retract a tongue inwardly to permit removal of the reservoir from the cylinder.

6. A master cylinder according to claim 4, wherein the cylinder port means forms a spigot and the at least one flexible arm extends externally of the spigot to engage a retaining formation of the spigot.

7. A master cylinder according to claim 1 wherein each arm extends beyond and generally parallel to a projecting hollow spigot connector of the reservoir having a port therethrough, a seal element surrounding said port and engaging opposed axially facing surfaces of the spigot connector and cylinder port means.

8. A master cylinder according to claim 1 wherein the reservoir, its connector means and the flexible catch means are integrally moulded.

9. A master cylinder according to claim 1 wherein the pressure cylinder is provided with at least one separately made port connector secured thereto and a shoulder is formed on each connector by turning over inwardly the outer extremity thereof.

10. A master cylinder comprising a hydraulic fluid reservoir having a container and at least one connector means engaged with port means of a pressure cylinder said connector means being provided with flexible catch means snap-engaged with a retaining formation of said pressure cylinder in order to retain the reservoir in an operative position on the cylinder,
wherein the pressure cylinder is provided with at least one separately made port connector secured thereto, said connector being apertured to receive an elbow of which one arm is received within a hollow spigot of the reservoir and the other arm projects outwardly of the port connector for connection to a hollow element.

11. A master cylinder comprising:
a hydraulic fluid reservoir having a container and an integrally formed first spigot;
a pressure cylinder having a first port receiving the first spigot, the port having a socket and a flange at its upper end; and
two flexible arms integrally formed with the spigot, each flexible arm having a shoulder which snap-fits with the flange of the pressure cylinder port when the spigot is pushed into a locking position, at which position a clearance is formed between the pressure cylinder and the hydraulic fluid reservoir to expose a portion of the two flexible arms for applying a radially inward releasing force to the two flexible arms.

12. A master cylinder according to claim 11, wherein the spigot has a radially enlarged distal end portion which seats on an inward end face of the port socket when the spigot is in the locking position.

13. A master cylinder according to claim 12, wherein the radially enlarged distal end portion of the spigot carries a seal.

14. A master cylinder according to claim 13, wherein the two flexible arms extend downwardly at an angle from a proximal end portion of the spigot.

15. A master cylinder according to claim 13, wherein the two flexible arms extend upwardly at an angle from the radially enlarged distal end portion of the spigot.

16. A master cylinder comprising a hydraulic fluid reservoir having a container and at least one connector means engaged with port means of a pressure cylinder said connector means being provided with flexible catch means snap-engaged with a retaining formation of said pressure cylinder in order to retain the reservoir in an operative position on the cylinder,
wherein the flexible catch means is in the form of at least one flexible arm having a formation thereon providing a shoulder engaging said retaining formation on the cylinder,
wherein each connector means is shaped to accommodate an annular sealing element sealing between respective opposing surfaces of the reservoir connector means and said port means, and
wherein the at least one flexible arm lies generally parallel to and externally of a projecting hollow spigot connector of the reservoir extending within said cylinder port means and communicating with a port of the cylinder.

17. A master cylinder according to claim 16, wherein each said shoulder projects laterally outwardly of said arm.

18. A master cylinder according to claim 16, wherein the at least one flexible arm is connected to the connector means at a location remote from the container and extends towards the latter, the free ends of the arms lying outwardly of the cylinder port means and being provided with a lateral extension which may be manipulated from the exterior to retract a tongue inwardly to permit removal of the reservoir from the cylinder.

19. A master cylinder according to claim 16, wherein the at least one flexible arm is connected to the reservoir adjacent the container and extends away from the latter.

20. A master cylinder according to claim 19, wherein the cylinder port means forms a spigot and the at least one flexible arm extends externally of the spigot to engage a retaining information of the spigot.

21. A master cylinder according to claim 16, wherein the reservoir, its connector means and the flexible catch means are integrally molded.

22. A master cylinder according to claim 16, wherein the pressure cylinder is provided with at least one separately made port connector secured thereto and a shoulder is formed on each connector by turning over inwardly the outer extremity thereof.

23. A master cylinder according to claim 16, wherein the pressure cylinder is provided with at least one separately made port connector secured thereto, said connector being apertured to receive an elbow of which one arm is received within a hollow spigot of the reservoir and the other arm projects outwardly of the port connector for connection to a hollow element.

24. A master cylinder comprising a hydraulic fluid reservoir having a container and at least one connector means engaged with port means of a pressure cylinder said connector means being provided with flexible catch means snap-engaged with a retaining formation of said pressure cylinder in order to retain the reservoir in an operative position on the cylinder,
wherein the flexible catch means is in the form of at least one flexible arm having a formation thereon providing a shoulder engaging said retaining formation on the cylinder,
wherein each connector means is shaped to accommodate an annular sealing element sealing between respective opposing surfaces of the reservoir connector means and said port means, and
wherein the reservoir, its connector means and the flexible catch means are integrally molded.

25. A master cylinder according to claim 24, wherein each said shoulder projects laterally outwardly of said arm.

26. A master cylinder according to claim 24, wherein the at least one flexible arm is connected to the connector means at a location remote from the container and extends towards the latter, the free ends of the arms lying outwardly of the cylinder port means and being provided with a lateral extension which may be manipulated from the exterior to retract a tongue inwardly to permit removal of the reservoir from the cylinder.

27. A master cylinder according to claim 24, wherein the at least one flexible arm is connected to the reservoir adjacent the container and extends away from the latter.

28. A master cylinder according to claim 27, wherein the cylinder port means forms a spigot and the at least one flexible arm extends externally of the spigot to engage a retaining formation of the spigot.

29. A master cylinder according to claim 24, wherein the pressure cylinder is provided with at least one separately made port connector secured thereto and a shoulder is formed on each connector by turning over inwardly the outer extremity thereof.

30. A master cylinder according to claim 24, wherein the pressure cylinder is provided with at least one separately made port connector secured thereto, said connector being apertured to receive an elbow of which one arm is received within a hollow spigot of the reservoir and the other arm projects outwardly of the port connector for connection to a hollow element.

31. A master cylinder according to claim 24, wherein the at least one flexible arm lies generally parallel to and externally of a projecting hollow spigot connector of the reservoir extending within said cylinder port means and communicating with a port of the cylinder.

32. A master cylinder comprising a hydraulic fluid reservoir having a container and at least one connector means engaged with port means of a pressure cylinder said connector means being provided with flexible catch means snap-engaged with a retaining formation of said pressure cylinder in order to retain the reservoir in an operative position on the cylinder,
   wherein the flexible catch means is in the form of at least one flexible arm having a formation thereon providing a shoulder engaging said retaining formation on the cylinder,
   wherein each connector means is shaped to accommodate an annular sealing element sealing between respective opposing surfaces of the reservoir connector means and said port means, and
   wherein the pressure cylinder is provided with at least one separately made port connector secured thereto and a shoulder is formed on each connector by turning over inwardly the outer extremity thereof.

33. A master cylinder according to claim 32, wherein each said shoulder projects laterally outwardly of said arm.

34. A master cylinder according to claim 32, wherein the at least one flexible arm is connected to the connector means at a location remote from the container and extends towards the latter, the free ends of the arms lying outwardly of the cylinder port means and being provided with a lateral extension which may be manipulated from the exterior to retract a tongue inwardly to permit removal of the reservoir from the cylinder.

* * * * *